Figure 1:
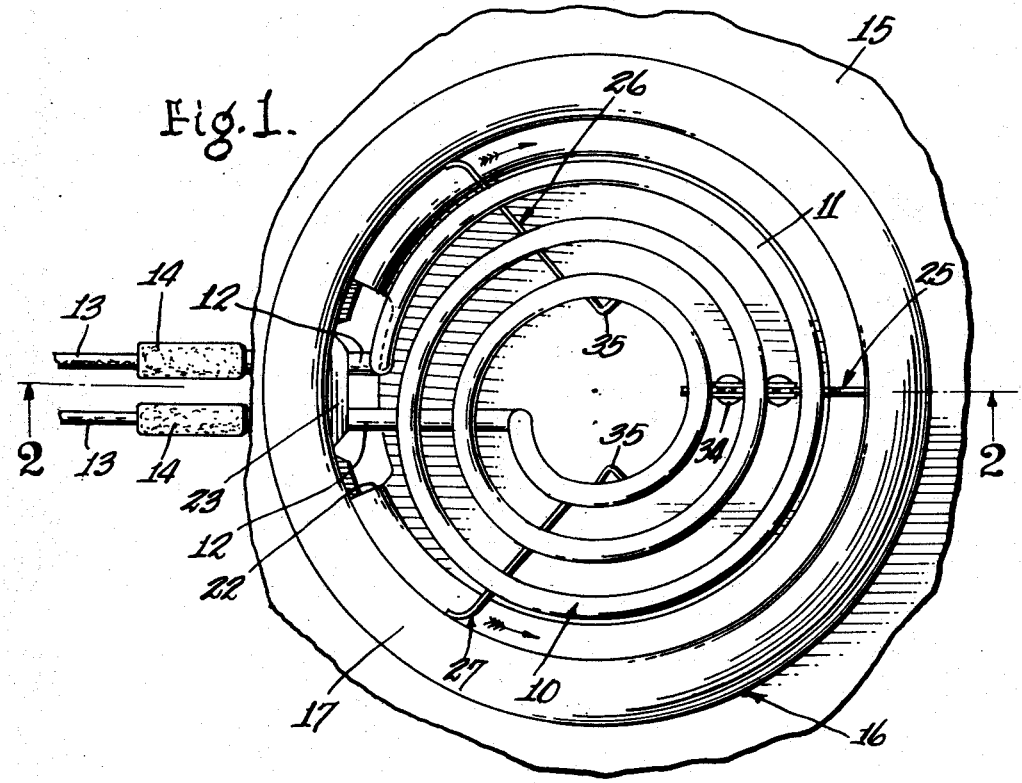

Jan. 8, 1963   G. E. AMMERMAN ET AL   3,072,775
ELECTRIC HEATER ASSEMBLY AND METHOD
Filed Aug. 11, 1960   2 Sheets-Sheet 1

INVENTOR.
GEORGE EDWARD AMMERMAN
and JOHN F. BENKO
By
ATTORNEY

Jan. 8, 1963 G. E. AMMERMAN ET AL 3,072,775
ELECTRIC HEATER ASSEMBLY AND METHOD
Filed Aug. 11, 1960 2 Sheets-Sheet 2
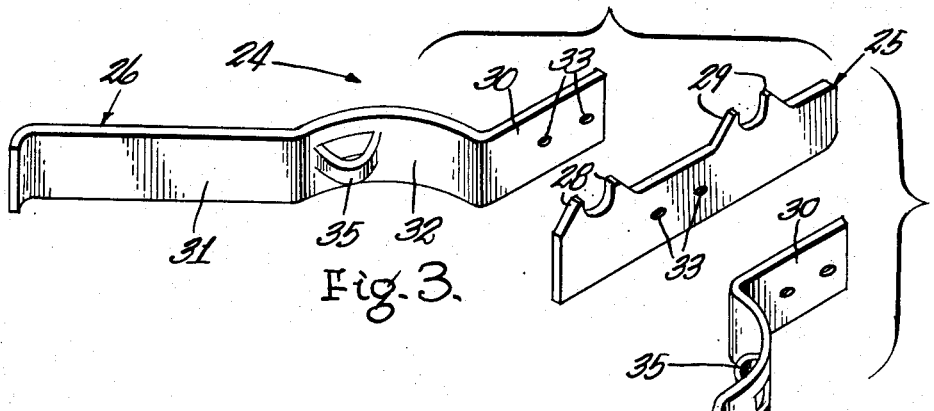
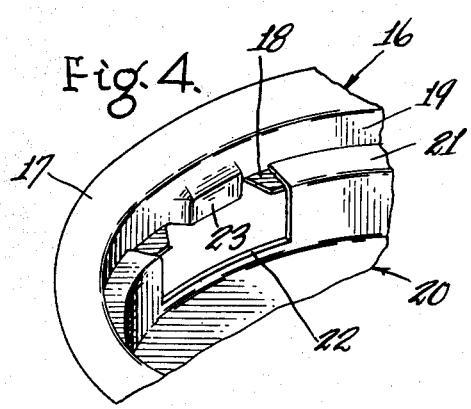
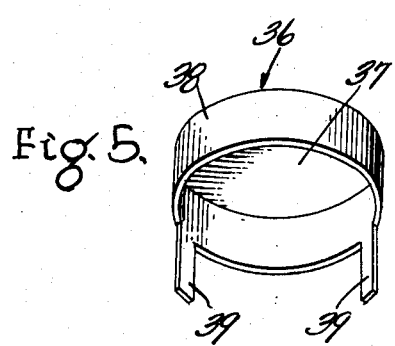
INVENTOR.
GEORGE EDWARD AMMERMAN
and JOHN F. BENKO
By Michael Williams
ATTORNEY United States Patent Office
3,072,775
Patented Jan. 8, 1963

3,072,775
ELECTRIC HEATER ASSEMBLY AND METHOD
George Edward Ammerman, Oakmont, Pa., and John F. Benko, Murfreesboro, Tenn., assignors to Edwin L. Wiegand Company, Pittsburgh, Pa.
Filed Aug. 11, 1960, Ser. No. 48,942
13 Claims. (Cl. 219—37)

The present invention relates to electric heater assemblies, more particularly to assemblies of the type adapted for use in ranges, hot plates and the like and to novel methods of assembly thereof, and the principal object of this invention is to provide new and improved assemblies and methods of the character described.

Although many prior-art heater assemblies of the surface, or range unit, type utilizing a tubular sheathed electric resistance heating element have been satisfactory in most respects, a common disability has been the high cost of the assembly which limited its use in low price structures. One of the primary objects attained by the present invention, therefore, is the provision of an assembly incorporating a tubular sheathed electric resistance heating element which can be manufactured and sold at a sufficiently low price to justify its use in even low price structures. This and other advantages will readily become apparent from a study of the following description and from the drawings appended hereto.

Figure 2:
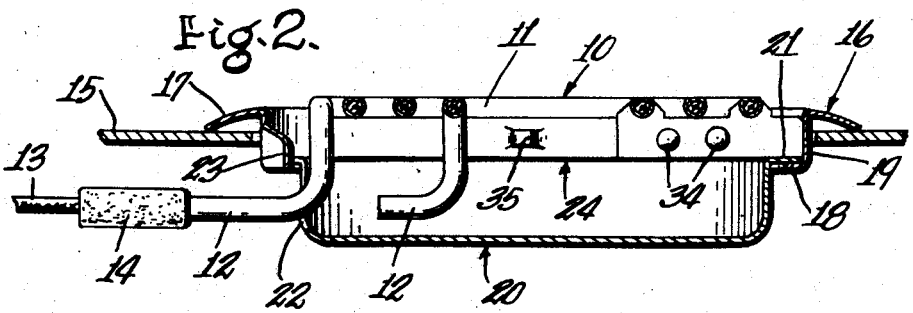

In the drawings accompanying this specification and forming a part of this application there is shown, for purpose of illustration, an embodiment which the invention may assume, and in these drawings:

FIGURE 1 is a top plan view of an electric heater assembly embodying the present invention, FIGURE 2 is a sectional view generally corresponding to the line 2—2 of FIGURE 1, FIGURE 3 is an exploded perspective view of certain details of construction, FIGURE 4 is a reduced size, fragmentary perspective view of other details of construction, and FIGURE 5 is a bottom-side perspective view of a detail.

With reference to FIGURES 1 and 2, the present heater assembly utilizes the usual elongated, tubular sheathed electric resistance heating element 10 whose intermediate, heat-generating portion 11 provides a plurality of convolutions forming a generally flat, circular heating surface which is adapted to underlie and support a vessel (not shown) to be heated. Such convolutions are preferably flattened at the top (see FIGURE 2) to improve heat-contact with the bottom of the vessel to be heated. The terminal ends 12 of the heating element are disposed in side-by-side relation beneath the heating surface of the intermediate heat-generating element portion 11 and extend beyond such heating surface for connection to a source of electrical energy.

Electrically connected to the free ends of respective element terminal ends 12 are insulated, flexible lead wires 13. Protecting each of the connections aforesaid is a molded body 14 of heat-resistant rubber or the like which extends between and is bonded to a respective element terminal end and the insulated covering of its attached lead wire. This construction completely seals the interior of the element against moisture or other foreign material, adequately protects the electrical connections against grounds or shorts, and eliminates the usual expensive terminal block.

In common with prior-art range-type or surface heater assemblies, the assembly herein disclosed is adapted to be supported by an apertured panel 15 which, in the present embodiment, may be considered as the top panel of a range or as the corresponding part of a hot plate or the like. As herein disclosed, a ring-like member 16 having an upper, radially outwardly extending flange portion 17, a lower, radially inwardly extending flange portion 18, and an intermediate, tubular portion 19, is supported by the panel 15 with the tubular portion 19 disposed within the panel aperture and with the flange portion 17 resting upon the upper surface of the panel. Supported by the member 16 is the usual removable reflector, or drip pan, 20 having a radially outwardly extending flange 21 which rests upon the flange 18 of the member 16.

Means are provided for insuring assembly of the element 10 with the panel 15 whereby the element terminal ends 12 will always project in generally the same direction; for example, to the left as seen in FIGURE 1, in order to prevent excess stressing and/or twisting of the lead wires 13. This objective is accomplished at the present time by the following arrangement of parts.

Assuming that the ring member 16 is removably retained in the position seen in FIGURES 1 and 2 by means of the usual spring clips (not shown) or the like and referring particularly to FIGURE 4 but as also may be seen in FIGURES 1 and 2, pan 20 is notched at 22 to pass the element terminal ends 12. The tubular portion 19 of the ring member 16 is provided with a radially inwardly extending abutment 23 adjacent the element terminal ends 12, which abutment is also disposed within the pan notch 22. Clearly, pan 20 can only be seated properly on the ring member flange 18 when the pan notch 22 is in register with the ring member abutment 23, and the element 10 can only be assembled with the ring member and the pan when the element terminal ends are in register with the pan notch 22. Accordingly, rotation of the element 10 from the position seen in FIGURES 1 and 2 will be prevented by engagement of the element terminal ends 12 with the margins of pan notch 22 while rotation of the pan will be prevented by engagement of the pan notch margins with the ring member abutment 23.

Turning now to the means for supporting the element 10 within the ring member 16, a supporting member 24, frequently known as a spider, underlies the heat-generating portion of the element and rests upon the pan flange 21. As will later be pointed out with greater particularity, spider 24 provides three structurally integrated legs 25, 26 and 27 (see FIGURE 1) arranged in spoke-like relation beneath the heat generating portion of the element. The spider legs 25, 26 and 27 are herein shown formed of strip material positioned on edge for maximum strength in a vertical direction with the outermost leg ends resting upon the pan flange 21 and bearing against the tubular ring portion 19. The legs of the spider 24 are formed of heat-resistant material, such as metal, and the legs 26, 27 preferably are somewhat resilient for a purpose to appear.

As seen in FIGURE 1, spider legs 26, 27 are biased away from each other, in the directions indicated by the arrows, to resilient engagement with the tubular portion 19 of the ring member. Such resilient engagement of the legs 26, 27 of the spider also urges spider leg 25 to engagement with the tubular ring portion thus maintaining the spider in spring-engagement with the ring member. As will later appear, spider 24 is secured to the heat-generation portion 11 of the heating element 10 and thus the spider resiliently retains the heating element assembled with the ring member 16.

With reference now to FIGURE 3, spider 24 is presently formed of three pieces which are secured together and form the respective legs 25, 26 and 27 aforesaid. Leg, or piece 25 comprises a short, rectilinear metal strip from whose upper margin project pairs of abutments 28 and 29. Abutment pairs 28, 29 are spaced from each other for registry with respective innermost and outermost convolutions of the heat-generating element portion, the abutments of each pair being spaced to closely receive a respective element convolution therebetween.

Still referring to FIGURE 3, spider legs, or pieces 26 and 27 are preferably identical and each presently comprises a metal strip having a rectilinear portion 30 for lying along a respective side of leg 25, a rectilinear portion 31 disposed at an angle with portion 30, and an arcuate portion 32 intermediate portions 30, 31 and generally conforming to the configuration of the innermost convolution of the heating element. Portions 30 of the legs 26, 27 and leg 25 are provided with aligned apertures 33 through which rivets 34 or the like (see FIGURE 1) may extend to secure the legs together into a structurally integral unit.

In assembling the spider legs 25, 26 and 27 with the element heat-generating portion 11, the following novel method is employed which facilitates assembly and contributes to efficient, low manufacturing costs. Leg 25 is first positioned beneath the heat-generating element portion, in opposed relation with the element terminal ends 12, and with the innermost element convolution between the leg abutments 28 and with the outermost element convolution between the leg abutments 29. The upper portions of the abutments of each pair are then shifted toward each other, as by a suitable die operation, to partially embrace a respective element convolution (see FIGURE 2) and thus crimp the leg 25 to the heating element. Legs 26 and 27 are then positioned beneath and in abutting relation with the element convolutions, with their portions 31 in diverging relation, with portions 30 against respective sides of leg 25, and with their arcuate portions 32 underlying the innermost element convolution. The rivets 34 may then be passed through the aligned apertures 33 and headed over to retain the parts assembled. Obviously, the legs 25, 26 and 27 could be welded together if this should prove to be more desirable than riveting.

With all of the previously described parts assembled as disclosed and disposed in the normal use position seen in FIGURES 1 and 2, disassembly, as for cleaning purposes, may readily be effected as follows: Element 10 will be grasped by the user and pulled upwardly until the spider is withdrawn from its spring-engagement with the tubular portion 19 of the ring member 16. This operation will be facilitated by upwardly tilting the side of the element opposite the element terminal ends 12. The drip pan 20 may now be removed from its resting place on the ring member flange 18 for cleaning purposes while the element 10 may be allowed to fall back into the ring member, or to partially rest upon the latter and the panel 15, in the event there is sufficient slack in the lead wires 13.

If removal of the ring member 16 from the panel 15 is desirable, the element 10 will be dropped through the ring member to rest upon the usual wall (not shown) which normally underlies the panel 15. The ring member may then be withdrawn from the panel aperture so that the former and the adjoining panel portions may be cleaned. Reassembly of the various parts to the positions seen in FIGURES 1 and 2 will be effected by reversing the foregoing disassembly operations.

While the construction thus far described provides a complete workable assembly, it is common practice to position a medallion or like body within the innermost element convolution to impart a more finished appearance. Such medallion may consist of a disk-like member secured in any suitable manner to the spider 24 so that its upper surface is slightly below the upper surface of the heat-generating element portion. At the present time, and as seen in FIGURE 3, the arcuate portion 32 of each spider leg 26, 27 is provided with vertically spaced, horizontally extending slits which define therebetween a small strap portion 35 which is displaced radially inwardly to provide a loop-like supporting ledge upon which the medallion rests.

Referring now to FIGURE 5, medallion 36 preferably has an inverted, shallow cup configuration to provide an upper, disk-like wall 37 margined by a depending annular flange 38. Depending from and integral with the flange 38 are radially spaced, elongated tongues 39 positioned for register with respective spider strap portions 35.

To assemble the medallion with the spider, the medallion tongues will be inserted through respective loops provided by the spider leg strap portions 35 with the medallion resting upon the strap portions and with its wall 37 uppermost. The free ends of the tongues 39, which free ends are sufficiently long to extend some distance beneath the strap portions, may then be twisted, or bent over, to retain the medallion assembled with the spider. It is to be understood, of course, that a conventional thermal sensing element may be substituted for the above described medallion in the event a temperature-controlled heater assembly is desired.

While the present embodiment discloses ring member 16 and pan 20 as each being separate and removable from the panel 15, it is contemplated that member 16 could be formed as an integral part of the top panel 15. Pan 20 might also be formed as an integral part of the ring member, the top panel, or as a part of the previously mentioned but not shown wall which normally underlies the panel 15.

In view of the foregoing it will be apparent to those skilled in the art that we have accomplished at least the principal object of our invention and it will also be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that our invention is not limited thereto.

We claim:

1. A heater assembly comprising a sheathed electric resistance heating element having a heat-generating portion for underlying a vessel to be heated, an element supporting structure, and a support member secured to and underlying and supporting the heat-generating portion of said element and providing three legs arranged in generally spoke-like relation with each other and having their outermost ends bearing against a confining wall of said structure, said outermost ends being movable to a contracted relation for disposition within the confines of said confining wall and resiliently biased to an expanded relation for spring-engagement with said wall to removably secure said support member and the attached element in predetermined position relative thereto.

2. The construction of claim 1 wherein said legs form a unitary resilient structure and wherein one of said legs is immovably secured to said heat-generating element portion while another is movable relative thereto.

3. The construction of claim 2 wherein both of said other legs are movable relative to said heat-generating element portion in a direction toward and away from each other.

4. The construction of claim 3 wherein all said support member legs are relatively rigid vertically to support said heat-generating element portion against deflection and wherein said other support member legs are flexible horizontally for spring-engagement with said structure.

5. The construction of claim 4 wherein said other support member legs are formed of strip material positioned on edge to provide the aforesaid vertical rigidity and horizontal flexibility.

6. A heater assembly comprising an elongated sheathed electric resistance heating element having a convoluted heat-generating portion providing a centrally apertured heating surface for underlying a vessel to be heated, an element supporting structure, and a support member underlying and supporting the heat-generating portion of said element and providing three legs arranged in spoke-like relation with each other and having their outermost ends engaged with said structure, one of said legs being immovably secured to said heat-generating element portion while said other legs are secured to said one leg radially outwardly of the aperture in said heating surface, each of said other legs having an arcuate portion partially circumscribing said heating surface aperture and underlying and supporting respective segments of the innermost element convolution.

7. The construction of claim 6 wherein said element supporting structure provides a recess defined by an annular wall abutting the outermost ends of said support member legs and wherein said other support member legs are biased away from each other to spring-engagement with said wall to removably secure said support member and the attached element in predetermined position relative thereto.

8. A heater assembly comprising an elongated sheathed electric resistance heating element having an intermediate, convoluted heat-generating portion providing a heating surface for underlying a vessel to be heated and having terminal end portions disposed in side-by-side relation beneath said heating surface and projecting therebeyond for conducting electrical energy to said heat-generating portion, an element supporting structure, and a support member underlying and supporting the heat-generating portion of said element and providing three legs arranged in spoke-like relation with each other and having their outermost ends engaged with said structure, one of said legs being immovably secured to said heat-generating portion in diametrically opposed relation to said element terminal end portions and said other legs extending angularly from said one leg to dispose their outer-most ends on respective sides of said element terminal end portions, said other legs being resiliently biased side-wise away from said one leg to urge their outer ends to spring-engagement with said supporting structure and thus removably secure said support member and the attached member in predetermined position relative thereto.

9. A heater assembly comprising a sheathed electric resistance heating element having a heat-generating portion for underlying a vessel to be heated and a terminal conductor portion projecting from said heat-generating portion for conducting electrical energy thereto, an element supporting structure providing a generally vertically disposed tubular wall with a radially inwardly directed annular flange at its lower end and with an abutment which extends radially inwardly of said wall adjacent said terminal conductor element portion, a reflector pan underlying said heat-generating element portion and having a radially outwardly directed annular flange resting upon the supporting structure flange, said pan also having a notch formed in its wall in register with both said supporting structure abutment and said terminal conductor element portion for maintaining said element, said pan and said supporting structure in predetermined alignment with each other, and a support member secured to and underlying said heat-generating element portion and resting upon said reflector pan annular flange, said support member having three legs arranged in generally spoke-like relation with each other and said legs being resiliently biased to spring-engagement with the tubular wall of said supporting structure to yieldably maintain said element assembled with said supporting structure.

10. A heater assembly, comprising a sheathed electric resistance heating element having a heat-generating portion adapted to underlie a vessel to be heated, a spider member secured to said element in underlying relation with respect to said heat-generating portion, said spider member including a plurality of legs extending radially of said heat-generating portion, and a supporting structure providing a shallow well having a vertically extending wall circumscribing said legs, the outermost ends of said legs abutting said wall and at least certain of said outermost ends being resiliently biased outwardly to abutting relation with said wall, said resiliently biased outer ends being movable to retracted relation relative to said wall for disposition and removal of said spider member respectively in and from said shallow well.

11. The construction of claim 10 wherein an adapter ring provides said shallow well, said ring being disposed within an opening in and supported from a stove panel.

12. The construction of claim 10 wherein said spider member is formed of strip metal positioned on edge to provide vertical rigidity.

13. A heater assembly, comprising a sheathed electric resistance heating element having a heat-generating portion adapted to underlie a vessel to be heated and having a central opening, a spider member secured to said element and having sheet metal legs disposed on end and underlying said heat-generating portion, parts of said legs being shaped in conformity with said central opening and each of said parts having vertically spaced horizontally extending slits with the portion between said slits displaced inwardly to form a horizontal shoulder and vertical opening, and a body such as a medallion and the like of a shape to fit within said vertical opening and supported upon said shoulders, said body having vertical tongues which fit within respective vertical openings.

References Cited in the file of this patent

UNITED STATES PATENTS

| | | |
|---|---|---|
| 2,413,478 | Wiegand | Dec. 31, 1946 |
| 2,414,667 | Price | Jan. 21, 1947 |
| 2,502,988 | Price | Apr. 4, 1950 |
| 2,662,158 | Vallorani et al. | Dec. 8, 1953 |
| 2,668,899 | Rutenber | Feb. 9, 1954 |
| 2,887,559 | Flett | May 19, 1959 |
| 2,923,802 | Price | Feb. 2, 1960 |
| 3,047,706 | Zentgraf | July 31, 1962 |